US009949068B2

(12) United States Patent
Jain et al.

(10) Patent No.: US 9,949,068 B2
(45) Date of Patent: Apr. 17, 2018

(54) METHOD AND APPARATUS FOR TO DETERMINE THE LOCATION OF A WEARABLE DEVICE

(71) Applicant: QUALCOMM Incorporated, San Diego, CA (US)

(72) Inventors: Amit Jain, San Diego, CA (US); Dinesh Subramani, San Diego, CA (US); Govind Ram Venkat Narayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/269,297

(22) Filed: Sep. 19, 2016

(65) Prior Publication Data
US 2018/0084374 A1    Mar. 22, 2018

(51) Int. Cl.
| H04M 11/04 | (2006.01) |
| H04W 4/02 | (2018.01) |
| H04W 4/14 | (2009.01) |
| H04W 4/22 | (2009.01) |
| H04W 4/00 | (2018.01) |
| H04B 17/318 | (2015.01) |
| G01S 19/17 | (2010.01) |

(Continued)

(52) U.S. Cl.
CPC ............. *H04W 4/02* (2013.01); *G01S 19/17* (2013.01); *H04B 17/318* (2015.01); *H04W 4/008* (2013.01); *H04W 4/14* (2013.01); *H04W 4/22* (2013.01); *H04W 84/12* (2013.01)

(58) Field of Classification Search
CPC ......... H04W 4/02; H04W 64/00; H04W 8/08; H04W 4/008; H04W 4/14; H04W 4/22; H04W 84/12; H04W 76/007; H04L 29/08657; H04B 17/318; G01S 19/17
USPC ...................................... 455/404.2
See application file for complete search history.

(56) References Cited

U.S. PATENT DOCUMENTS

| 6,816,734 B2 | 11/2004 | Wong et al. |
| 6,937,150 B2 | 8/2005 | Medema et al. |

(Continued)

FOREIGN PATENT DOCUMENTS

| CN | 104735615 A | 6/2015 |
| WO | 2016048518 A1 | 3/2016 |

OTHER PUBLICATIONS

International Search Report and Written Opinion—PCT/US2017/046734—ISA/EPO—dated Nov. 6, 2017.

*Primary Examiner* — Huy C Ho
(74) *Attorney, Agent, or Firm* — Thien T. Nguyen

(57) ABSTRACT

A mobile station that is wirelessly linked to a wearable device, receives a request to initiate a location session from the wearable device, e.g., which may be in the form of an emergency call. The mobile station determines whether the location of the mobile station may be used as a location of the wearable device, e.g., by determining if the wearable device is proximate to the mobile station. For example, the mobile station may check to see if the mobile station is wirelessly linked to a wearable device through a wireless personal area network (WPAN). The mobile station initiates the location session for the wearable device with a location server. If the location of the mobile station may not be used as a location of the wearable device, the location session for the wearable device does not use position information obtained from the mobile station.

29 Claims, 6 Drawing Sheets

(51) Int. Cl.
*H04W 24/00* (2009.01)
*H04W 84/12* (2009.01)

(56) References Cited

U.S. PATENT DOCUMENTS

| | | |
|---|---|---|
| RE42,435 E | 6/2011 | Katz |
| 8,918,075 B2 | 12/2014 | Maier et al. |
| 9,253,616 B1 | 2/2016 | Haney |
| 2014/0292564 A1 | 10/2014 | Park et al. |
| 2015/0213708 A1* | 7/2015 | Barzangi ............... H04W 4/028 455/404.2 |

* cited by examiner

METHOD AND APPARATUS FOR TO DETERMINE THE LOCATION OF A WEARABLE DEVICE

BACKGROUND

Background Field

The subject matter disclosed herein relates to electronic devices, and more particularly to methods and apparatuses for use in determining a correct location for a wearable device that is wirelessly linked with a remotely located mobile station.

Relevant Background

Wearable devices are accessories and clothing that incorporate electronic technologies, such as computing, user interfacing, and wireless connectivity. Wearable devices may wirelessly connect to other devices, such as a user's mobile phone, in order to exchange data or collaborate to perform various functions. Examples of wearable devices including, e.g., smart watches, digital glasses, and fitness monitors to name a few. One of many applications of wearable devices is a communications platform for the user. Wearable devices, for example, may be used to communicate via text or phone.

With the quickly growing market for wearable technology, scenarios such as handling emergency calls from wearable devices will increase. As mandated by the Federal Communications Commission (FCC), most wireless carriers have deployed assisted Global Positioning System (GPS) protocols to assist with accurate positioning during an E911 (Enhanced 911) call.

There are problems, however, associated with determining a location of user via a wearable device, e.g., when a user places an E911 call or sends a Short Message Services (SMS) text-to-911 message, or otherwise requests a location session with a wearable device.

A significant problem is that wearable devices may connect to a mobile station, i.e., the user's mobile phone, through a wireless Local Area Network (WLAN), such as Wi-Fi, and thus, the wearable device may not be in the vicinity of the mobile station when the emergency call/text is made or a non-emergency location session is requested. The mobile station connects to the wireless Wide Area Network (WWAN), i.e., the cellular network, and actually initiates the E911 call or text, or non-emergency location session. As a result, the location session will be based on the position of the mobile station, while the wearable device and user may be in a different location. Consequently, an incorrect location may be reported to the public-safety answering point (PSAP) or location server.

SUMMARY

A mobile station that is wirelessly linked to a wearable device, receives a request to initiate a location session from the wearable device, e.g., which may be in the form of an emergency call. The mobile station determines whether the location of the mobile station may be used as a location of the wearable device, e.g., by determining if the wearable device is proximate to the mobile station. For example, the mobile station may check to see if the mobile station is wirelessly linked to a wearable device through a wireless personal area network (WPAN). The mobile station initiates the location session for the wearable device with a location server. If the location of the mobile station may not be used as a location of the wearable device, the location session for the wearable device does not use position information obtained from the mobile station.

In one implementation, a method of location determination for a wearable device includes receiving by a mobile station a request to initiate a location session from the wearable device, the mobile station being wirelessly linked with the wearable device; determining by the mobile station that a location fix for the mobile station may not be used as a location fix for the wearable device; and initiating by the mobile station the location session for the wearable device with a location server, wherein the location session for the wearable device does not use position information from the mobile station.

In one implementation, a mobile station for location determination of a wearable device includes a wireless transceiver capable of wireless communication with a location server, and at least one processor coupled to the wireless transceiver, the at least one processor configured to receive a request to initiate a location session from the wearable device that is wirelessly linked by the mobile station, determine that a location fix for the mobile station may not be used as a location fix for the wearable device, and initiate the location session for the wearable device with the location server through the wireless transceiver, wherein the location session for the wearable device does not use position information from the mobile station.

In one implementation, a mobile station for location determination of a wearable device, includes means for receiving by the mobile station a request to initiate a location session from the wearable device, the mobile station being wirelessly linked with the wearable device; means for determining by the mobile station that that a location fix for the mobile station may not be used as a location fix for the wearable device; and means for initiating by the mobile station the location session for the wearable device with a location server, wherein the location session for the wearable device does not use position information from the mobile station.

In one implementation, a non-transitory computer-readable medium for location determination of a wearable device includes program code to receive by a mobile station a request to initiate a location session from the wearable device, the mobile station being wirelessly linked with the wearable device; program code to determine by the mobile station that a location fix for the mobile station may not be used as a location fix for the wearable device; and program code to initiate by the mobile station the location session for the wearable device with a location server, wherein the location session for the wearable device does not use position information from the mobile station.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
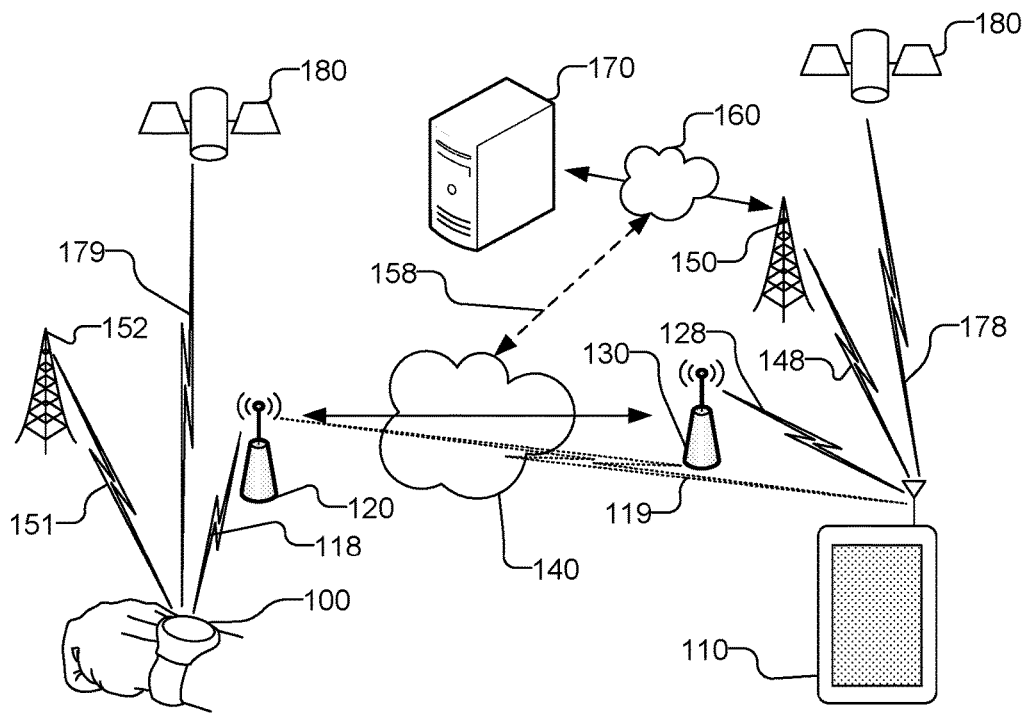
FIG. 1 is a diagram illustrating a network architecture for location support of a wearable device in wireless communication with a mobile station and a location server.

FIG. 1 is a diagram illustrating a network architecture for location support of a wearable device 100 that is in wireless communication with a mobile station 110 that is not in the same location as the wearable device 100. As illustrated, the wearable device 100 has an indirect wireless connection with the mobile station 110 through a wireless link 118 between wearable device 100 and a local transceiver 120 that may, e.g., be a wireless Local Area Network (WLANs), e.g., an IEEE 802.11 network, through a wireless link 128 between mobile station 110 and the local transceivers 130 that may be, e.g., a WLAN, and the wireless communication link 140 between the local transceivers 120 and 130, which may be one or more wireless links or the Internet. Other indirect wireless connections between the wearable device 100 and the mobile station 110 are possible, including one or more Wireless Wide Area Networks (WWAN), e.g., illustrated by the wireless link 148 between the mobile station 110 and a cellular transceiver 150, and a wireless communication link 158 between the wireless communication link 140 and the WWAN communication link 160 to the cellular transceiver 150. In some implementations, an indirect wireless connection between the wearable device 100 and the mobile station 110 may be through the same local transceiver in a WLAN as illustrated, for example, by the wireless link 118 between wearable device 100 and the local transceiver 120 and a wireless link 119 between the mobile station 110 and the local transceiver 120. Additionally, the wearable device 100 itself may be wirelessly coupled to a WWAN network, e.g., through a wireless link 151 to a cellular transceiver 152 or a wireless link (not shown) to cellular transceiver 150.

The wearable device 100 and the mobile station 110 are capable of being wirelessly linked directly with each other using a short range communication technology or a wireless personal area network (WPAN), such as Bluetooth®, if the wearable device 100 and the mobile station 110 are proximate to each other. FIG. 1, however, illustrates the wearable device 100 and the mobile station 110 as being remotely located, i.e., not proximate to each other, and accordingly wearable device 100 and the mobile station 110 cannot be wirelessly linked directly with each other using the short range communication technology or WPAN and instead are indirectly linked together via multiple wireless links, as illustrated. In general, proximate, as used herein, indicates that the wearable device 100 is close enough to the mobile station 110 that a short range communication technology or WPAN may be used to link the wearable device 100 with the mobile station 110. In some implementations, for example, if a local transceiver 120 has a limited coverage area, the wearable device 100 and mobile station 110 may be considered to be proximate to each other if they are connected through the same local transceiver 120. In other implementations, however, such as where the local transceiver 120 has a large coverage area compared to the desired accuracy of the position fix, the wearable device 100 and mobile station 110 may not be considered to be proximate to each other when they are connected through the same local transceiver 120. When the wearable device 100 and the mobile station 110 are not proximate, the wearable device 100 and the mobile station 110 are not at the same location, and in fact, the location of the wearable device 100 relative to the mobile station 110 may be unknown. Consequently, when the wearable device 100 and the mobile station 110 are not proximate, a location fix for the mobile station 110 may not be used as a location fix of the wearable device 100 as there is a large, unknown distance between the two.

The wearable device 100 is illustrated as a watch, but may be any wearable technology device with which the user may interface and which communicates wirelessly with mobile station 110, e.g., through a WLAN network, e.g., an IEEE 802.11, a short range communication technology, WPAN network, e.g., Bluetooth®, or a WWAN network, such as a cellular communication network. For example, the wearable device 100 may be a wearable device such as glasses, a wristband, clothing, jewelry, helmet, etc. The wearable device 100 may transmit wireless signals to, or receive wireless signals from local transceiver 120, cellular transceiver 152 or other transceiver devices. A local transceiver 120 may comprise, e.g., an access point (AP), a router, a bridge, a Bluetooth Transmitter, radio-frequency identification (RFID), and visual light communication (VLC) and may provide access to a WLAN or WPAN network through which the wearable device 100 may be wirelessly connected to the mobile station 110. The cellular transceiver 152 may comprises, e.g., a femtocell, pico cell, small cell, a wireless base transceiver subsystem (BTS), a Node B or an evolved NodeB (eNodeB) and may provide access to a WWAN network through which the wearable device 100 may be wirelessly connected to the mobile station 110. Of course it should be understood that these are merely examples of networks that may communicate with the wearable device 100 over a wireless link, and claimed subject matter is not limited in this respect.

The mobile station 110 may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device that is capable of communicating wirelessly with the wearable device 100. The mobile station 110 is capable of accessing a WLAN network, e.g., an IEEE 802.11, a short range communication technology, WPAN network, e.g., Bluetooth®, or a WWAN network, such as a cellular communication network, by wireless links 128 or 148 with local transceiver 130 or cellular transceiver 150, respectively. Similar to local transceiver 120, discussed above, local transceiver 130 may comprise, e.g., an access point (AP), a router, a bridge, a Bluetooth Transmitter, radio-frequency identification (RFID), and visual light communication (VLC) and may provide access to a WLAN or WPAN network through which the mobile station 110 may be wirelessly connected to the wearable device 100. Moreover, the cellular transceiver 150 may comprises, e.g., a femtocell, pico cell, small cell, a wireless base transceiver subsystem (BTS), a Node B or an evolved NodeB (eNodeB) and may provide access to a WWAN network through which the mobile station 110 may be wirelessly connected to the wearable device 100. Of course it should be understood that these are merely examples of networks that may communicate with the wearable device 100 over a wireless link, and claimed subject matter is not limited in this respect.

Examples of network technologies that may support wireless links 148 and 151 with cellular transceivers 150 and 152 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 150, 152 may comprise deployments of equipment providing subscriber access to a wireless telecommunication network for a service (e.g., under a service contract). Here, cellular transceiver 150, 152 may perform functions of a cellular base station in servicing subscriber devices within a cell determined based, at least in part, on a range at which the cellular transceivers 150, 152 are capable of providing access service.

In a particular implementation, cellular transceivers 150, 152 and local transceivers 120, 130 may communicate with a location server 170 over wireless communication links 140, 158, or 160. In some implementations, the location server 170 may be collocated with cellular transceiver 150. The network connected to the location server 170 may comprise any combination of wired or wireless links and may include cellular transceivers 150, 152 and/or local transceivers 120, 130. In a particular implementation, the network between location server 170 and mobile station 110 or between location server and wearable device 100 may be facilitated through an Internet Protocol (IP) or other infrastructure capable of facilitating communication through local transceivers 120, 130 or cellular transceivers 150, 152. In an embodiment, the network between location server 170 and mobile station 110 or between location server 170 and wearable device 100 may also facilitate communication between wearable device 100, mobile station 110, location server 170, and a public safety answering point (PSAP). In another implementation, the network between location server 170 and mobile station 110 or between location server 170 and wearable device 100 may comprise cellular communication network infrastructure such as, for example, a base station controller or packet based or circuit based switching center (not shown) to facilitate mobile cellular communication with the mobile station 110 or wearable device 100.

In a particular implementation, the network between location server 170 and mobile station 110 or between location server 170 and wearable device 100 may comprise personal area networks (PAN) elements, such as a Bluetooth Transmitter, radio-frequency identification (RFID), and visual light communication (VLC) or a local area network (LAN) elements such as Wi-Fi APs, routers and bridges and may include or have links to gateway elements that provide access to wide area networks such as the Internet. In other implementations, the network between location server 170 and mobile station 110 or between location server 170 and wearable device 100 may comprise a PAN or LAN and may or may not have access to a WWAN network but may not provide any such access (if supported) to wearable device 100 or mobile station 110. In some implementations, the network between location server 170 and mobile station 110 or between location server 170 and wearable device 100 may comprise multiple networks (e.g., one or more wireless networks and/or the Internet). In one implementation, the network between location server 170 and mobile station 110 or between location server 170 and wearable device 100 may include one or more serving gateways or Packet Data Network gateways. In addition, one or more of location servers may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in the network.

In particular implementations, and as discussed below, one or both of the wearable device 100 and the mobile station 110 may have circuitry and processing resources capable of obtaining location related measurements, e.g. for signals 178, 179 received from GPS or other Satellite Positioning System (SPS) satellites 180, local transceivers 120, 130, or cellular transceivers 150, 152, and possibly computing a position fix or estimated location based on these location related measurements. The wearable device 100 and the mobile station 110 may be configured to receive information, such as geographic data and/or assistance data during a location session with the location server 170. For example, the location server 170 may be a Secure User Plane Location (SUPL) Location Platform (SLP) and the location session may be a location session according to SUPL service protocol. The location session may further support one or more positioning protocols in order to transfer positioning capability information, assistance data and location measurement or location estimate information between the wearable device 100, the mobile station 110, and the location server 170. In the case of a SUPL location session, both the SUPL service protocol, known as the User Plane Location Protocol (ULP), and the positioning protocol may be supported in an end to end manner by and between the wearable device 100, the mobile station 110, and the location server 170 with the ULP protocol carrying the positioning protocol. The positioning protocol may be, for example, LPP or LPP plus LPPe. LPP is defined by 3GPP in 3GPP Technical Specification (TS) 36.355 which is publicly available and LPPe is defined by OMA in OMA TS OMA-TS-LPPe-V1_0 which is publicly available. The location server 170 may be referred to as a server and may be an SLP, a Serving Mobile Location Center (SMLC) defined by 3GPP, a Position Determining Entity (PDE) defined by 3GPP2, a Standalone SMLC (SAS) defined by 3GPP or some other type of server.

In some implementations, location related measurements obtained by the wearable device 100 or the mobile station 110 may be transferred to a location server 170, which may be an enhanced serving mobile location center (E-SMLC) or SUPL location platform (SLP), after which the location server 170 may estimate or determine a location for the wearable device 100 or the mobile station 110 based on the measurements. Location related measurements obtained by the wearable device 100 or the mobile station 110 may include measurements of signals 178, 179 received from satellites belonging to an SPS or Global Navigation Satellite System (GNSS) such as GPS, GLONASS, Galileo or Beidou and/or may include measurements of signals received from terrestrial transmitters fixed at known locations, e.g., such as local transceivers 120, 130 or cellular transceivers 150, 152.

The wearable device 100 or the mobile station 110 or a separate location server 170 may then obtain a location estimate for the wearable device 100 or the mobile station 110 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at the wearable device 100 or the mobile station 110 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at the wearable device 100 or the mobile station 110. Here, server 170 may be capable of providing positioning assistance data to the wearable device 100 or the mobile station 110 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 170 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, the wearable device 100 or the mobile station 110 may obtain measurements of received signal strength indicator (RSSI) or round trip signal propagation time (RTT) for signals from cellular transceivers 150, 152 and/or local transceiver 120, 130. The wearable device 100 or the mobile station 110 may use these measurements together with assistance data (e.g. terrestrial almanac data or GNSS satellite data such as GNSS Almanac and/or GNSS Ephemeris information) received from a server 170 to determine a location for the wearable device 100 or the mobile station 110 or may transfer the measurements to the server 170 (or a different server) to perform the same determination. A call from mobile station 110 may be routed, based on the location of the wearable device 100 or the mobile station 110, and connected to a Public Safety Answering Point (PSAP), for example, via wireless communication link 160 or communications link 140.

An estimate of a location of a mobile device (e.g., the wearable device 100 or the mobile station 110) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The wearable device 100 may request a location session, e.g., after a user places an E911 call or send an SMS text-to-911 message with the wearable device 100, or the mobile device otherwise request a non-emergency location session. The mobile station 110 receives the request for a location session from the wearable device 100, e.g., via local transceivers 120, 130, and places the E911 call or sends the text-to-911 message, and thus initiates the emergency location session or otherwise initiates the non-emergency location session, e.g., via the cellular transceiver 150. Typically, because the mobile station 110 initiated the emergency or non-emergency location session, position information from the mobile station 110 will be used in the location session. However, if the mobile station 110 is not proximate to the wearable device 100, position information from the mobile station 110 should not be used in the location session. For example, if the user and wearable device 100 are not in the vicinity of the mobile station 110, use of position information from the mobile station 110 in the location session will result in an incorrect position fix for the user, which my then be reported to the public-safety answering point (PSAP) or location server.

Accordingly, the mobile station 110 determines whether a location fix for the mobile station 110 may or may not be used as a location fix for the wearable device 100, i.e., whether the wearable device 100 is proximate to the mobile station 110. If the mobile station 110 determines that the wearable device 100 is not proximate to the mobile station 110, after initiating the location session, position information from the mobile station 110, including data from SPS system 180 via signal 178, data from link 148 with cellular transceiver 150 or link 128 with local transceiver 130 is not used in the location session for the wearable device 100. Instead, the mobile station 110 may receive position information from the wearable device 100, e.g., data acquired by the wearable device 100 from the SPS system 180 via signal 179, or data acquired from link 118 with local transceiver 120 or link 151 from cellular transceiver 152, data from sensors including camera, inertial sensors, pressure sensors, etc., or a position fix determined by the wearable device 100, and may transmit the position information from the wearable device 100 to the location server 170. Alternatively, after initiating the location session, the mobile station 110 may drop from the location session leaving the wearable device 100 to wirelessly communicate with the location server 170 during the location session through link 118 with the local transceiver 120 or link 151 with cellular transmitter 152.

Figure 2:
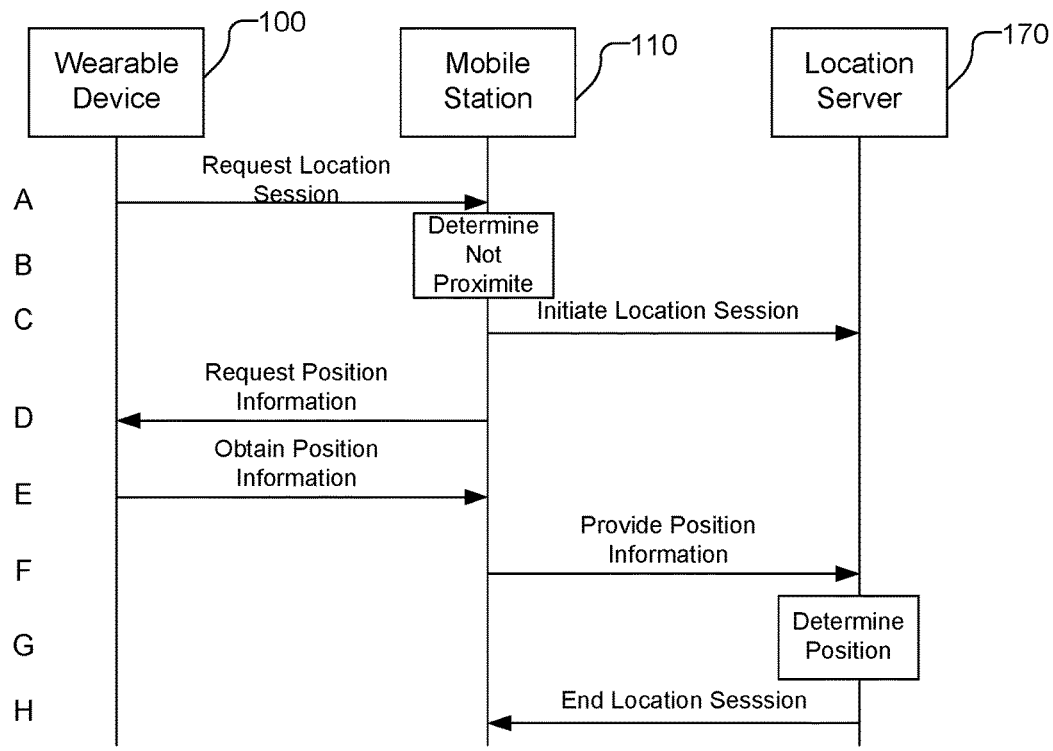
FIG. 2 is a call flow illustrating a location session for a wearable device using a mobile station and a location server.

FIG. 2 is a call flow illustrating a location session for a wearable device 100 using a mobile station 110 and a location server 170. At step A, the wearable device 100 sends a request for a location session to the mobile station 110. The request for a location session, by way of example, may be from placing an emergency call, e.g., dialing 911 or sending an SMS text-to-911 message, with the wearable device 100 that is wirelessly transmitted to the mobile station 110. Once the emergency call is completed by the mobile station 110, an emergency location session is automatically initiated, which is why placing an emergency call is considered herein to be a request for a location session.

The location session may alternatively be a non-emergency location session, which may be requested as a result of launching a particular application, such as a navigation application, in the wearable device 100.

The mobile station 110 determines whether a location fix for the mobile station 110 may or may not be used as a location fix for the wearable device 100, i.e., whether the wearable device 100 is proximate to the mobile station 110 in step B. The mobile station 110 may determine whether a location fix for the mobile station 110 may or may not be used as a location fix for the wearable device 100 by determining how the mobile station 110 and the wearable device 100 are wirelessly connected. For example, if the mobile station 110 and the wearable device 100 are wirelessly linked directly through a short range communication technology or WPAN, e.g., such as Bluetooth®, then the mobile station 110 and the wearable device 100 must be proximate and the location of the mobile station 110 may be used as the location of the wearable device 100.

Conversely, as illustrated in FIG. 2, the mobile station 110 may determine that the wearable device 100 is not proximate to the mobile station 110 and, thus, a location fix for the mobile station 110 may not be used as a location fix for the wearable device 100. For example, the mobile station 110 may determine that the wearable device 100 and the mobile station 110 are not wirelessly linked directly together. In one implementation, for example, the mobile station 110 may determine that the wearable device 100 and the mobile station 110 are not wirelessly linked directly through a short range communication technology or WPAN, e.g., such as Bluetooth®. In some implementations, even if the mobile station 110 and wearable device 100 are wirelessly linked through a same local transceiver in a WLAN, as illustrated by links 118 and 119 in FIG. 1, the mobile station 110 may determine that the wearable device 100 is not proximate to the mobile station 110, e.g., if they are not wirelessly linked directly through a short range communication technology or WPAN, e.g., such as Bluetooth®. The mobile station 110 may also determine that the wearable device 100 is not proximate to the mobile station 110 if the mobile station 110 and wearable device 100 are not wirelessly linked through the same local transceiver in the WLAN. The mobile station 110 may alternatively determine whether the wearable device 100 is proximate to the mobile station 110 using indirect means, such as monitoring sensors on the mobile station 110. For example, motion sensors on the mobile station 110 may indicate that the mobile station 110 did not move when the location session request from the wearable device 100 was made, or, e.g., for a period of time preceding the location request, which indicates that the mobile station 110 is not being held or is not on the person of the user of the wearable device 100. In another example, camera sensors from the mobile station 110 and the wearable device 100 may be used to determine whether mobile station 110 is in the same environment as the wearable device 100, e.g., through a comparison of image data, including light levels, objects captured in images, or features extracted from the images.

In step C, the mobile station 110 sends a message to the location server 170 to initiate the location session. The location session may be any appropriate type of location session including SUPL, LPP, and LPPe, type location sessions. As illustrated the mobile station 110 may request position information from the wearable device 100 in step D and may receive the position information from the wearable device 100 in step E. By way of example, the position information from the wearable device 100 may include data acquired by the wearable device 100 from the SPS system 180. The data acquired from the SPS system 180 may be, e.g., the measured data or a position fix determined by the wearable device 100 using the SPS data. The position information may also or alternatively be data acquired from a WPAN or WLAN, illustrated by local transceiver 120, or WWAN, illustrated by cellular transceiver 152, as well as data from sensors including cameras, inertial sensors, pressure sensors, a position fix determined by the wearable device 100, or a combination of any of the foregoing. For example, the position information may be a received signal strength indicator (RSSI) and/or round trip time (RTT) measurements from one or more of an access points, a router, a bridge, a femtocell, a Bluetooth Transmitter, pico cell, small cell, radio-frequency identification (RFID), and visual light communication (VLC), base station, or a combination thereof. Additionally, the wearable device 100 may process a portion or all of the data, e.g., to determine a position fix, and the position fix may be transmitted as the position information to the mobile station 110 in step E. It should be understood that additional data may be provided to or from the wearable device 100. For example, the mobile station 110 may obtain assistance data from the location server 170 and may provide the assistance data to the wearable device 100 prior to or along with the request for position information in step D.

In step F, the mobile station 110 transmits the position information from the wearable device 100 to the location server 170. The position information transmitted to the location server 170 may be the same position information received from the wearable device 100 or the mobile station 110 may process a portion or all of the data, e.g., to determine a position fix, and the position fix may be transmitted as the position information to the location server 170. In step G, the location server 170 determines the position fix (assuming it was not determined by wearable device 100 or mobile station 110) using the position information received from the mobile station in step F, and the location session is ended in step H.

Figure 3:
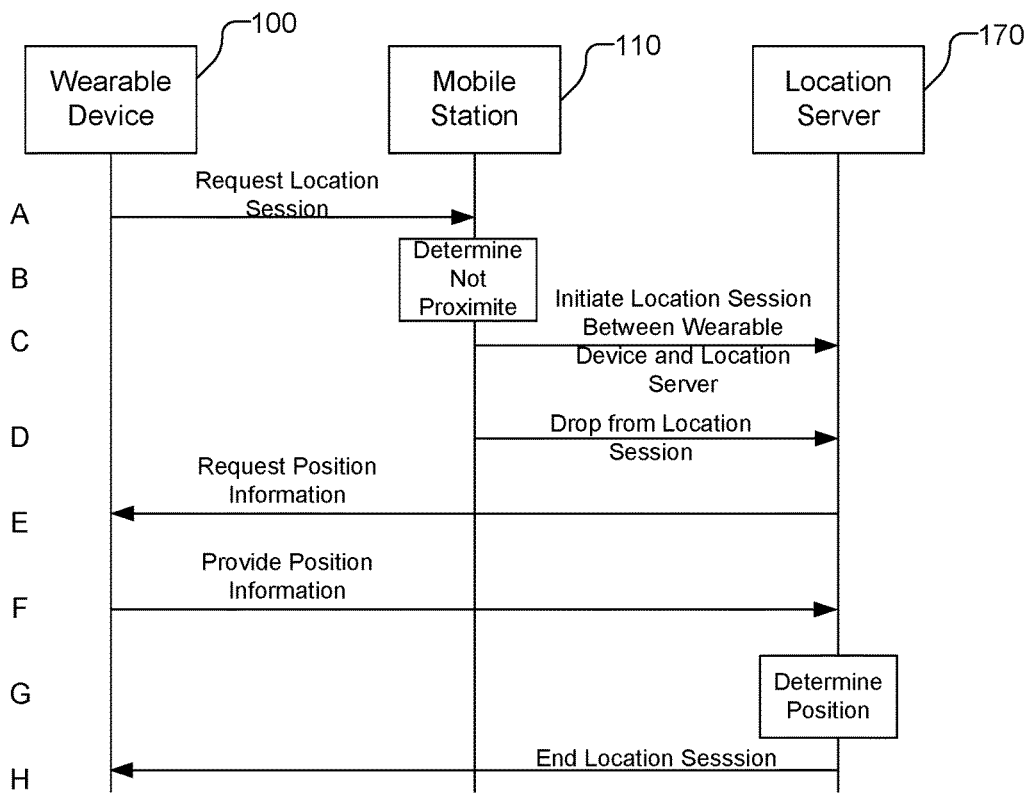
FIG. 3 is another call flow illustrating a location session for a wearable device using a mobile station and a location server, in which position information from the wearable device is provided directly to the location server.

FIG. 3 is another call flow illustrating a location session for a wearable device 100 using a mobile station 110 and a location server 170. Similar to the call flow of FIG. 2, the wearable device 100 sends a request for a location session to the mobile station 110 in step A and the mobile station 110 may determine that the wearable device 100 is not proximate to the mobile station 110 and, thus, a location fix for the mobile station 110 may not be used as a location fix for the wearable device 100 in step B.

In step C, the mobile station 110 sends a message to the location server 170 to initiate the location session between the wearable device 100 and the location server 170. Thus, the mobile station 110 initiates the location session with the location server 170, but passes the location session off to the wearable device 100. The wearable device 100 then performs the location session with the location server 170 e.g., via local transceiver 120 or cellular transceiver 152. The mobile station 110 may drop from the location session, as illustrated, in step D.

The location server 170 may request position information from the wearable device 100 in step E and may receive the position information from the wearable device 100 in step F. As discussed above, the position information from the wearable device 100 may include data acquired by the wearable device 100 from the SPS system 180, including measurements or a position fix, and/or may include data acquired from the WPAN or WLAN, illustrated by local transceiver 120, or WWAN, illustrated by cellular transceiver 152, as well as data from sensors including cameras, inertial sensors, pressure sensors, etc., or a combination thereof, or a position fix determined by the wearable device 100. The position information may include RSSI and RTT measurements from one or more of an access points, a router, a bridge, a femtocell, a Bluetooth Transmitter, pico cell, small cell, radio-frequency identification (RFID), and visual light communication (VLC), base stations, or a combination thereof. The wearable device 100 may process a portion or all of the data, e.g., to determine a position fix, and the position fix may be transmitted as the position information to the mobile station 110 in step E. It should be understood that additional data may be provided to or from the wearable device 100. The location server 170 may provide assistance data to the wearable device 100 prior to or along with the request for position information in step E.

In step G, the location server 170 determines the position fix (if not previously determined by wearable device 100) using the position information received from the mobile station in step F, and the location session is ended in step H.

Figure 4:
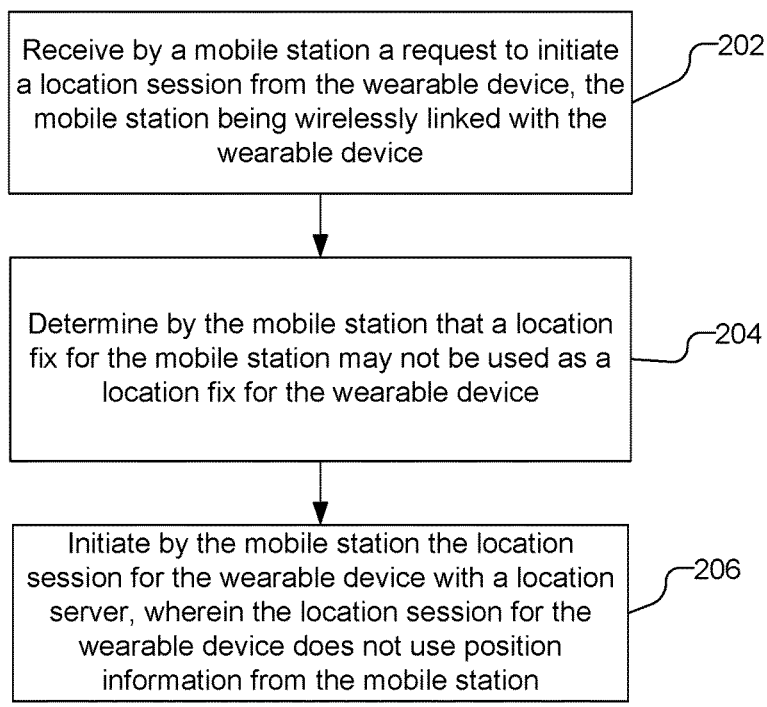
FIG. 4 is a flow chart illustrating a method of location determination for a wearable device.

FIG. 4 is a flow chart illustrating a method of location determination for a wearable device. As illustrated, a request to initiate a location session from the wearable device is received by a mobile station, the mobile station being wirelessly linked with the wearable device (202). The request to initiate the location session from the wearable device may be, e.g., an emergency call from the wearable device.

The mobile station determines that a location fix for the mobile station may not be used as a location fix for the wearable device (204). As discussed above, the mobile station may determine that a location fix for the mobile station may not be used as a location fix for the wearable device because the wearable device is not proximate to the mobile station. For example, the mobile station may determine that the wearable device and the mobile station are not wirelessly linked directly together. For example, the mobile station may determine that the wearable device and the mobile station are not wirelessly linked directly through a short range communication technology or WPAN, e.g., such as Bluetooth®. In some implementations, even if the mobile station and wearable device are wirelessly linked through a same local transceiver in a WLAN, the mobile station may determine that the wearable device is not proximate to the mobile station, e.g., if they are not wirelessly linked directly through a short range communication technology or WPAN, e.g., such as Bluetooth®. The mobile station may also determine that the wearable device is not proximate to the mobile station if the mobile station and wearable device are not wirelessly linked through the same local transceiver in the WLAN. For example, motion sensors may be used to determine that the mobile station is not being held by the user, e.g., at the time or for a period before the request to initiate the location session is received. In another example, camera sensors may be used to determine that the mobile station is not in a same environment as the wearable device, e.g., through a comparison of image data from the wearable device, including light levels, objects captured in images, or features extracted from the images.

The mobile station initiates the location session for the wearable device with a location server, wherein the location session for the wearable device does not use position information from the mobile station (206).

Figure 5:
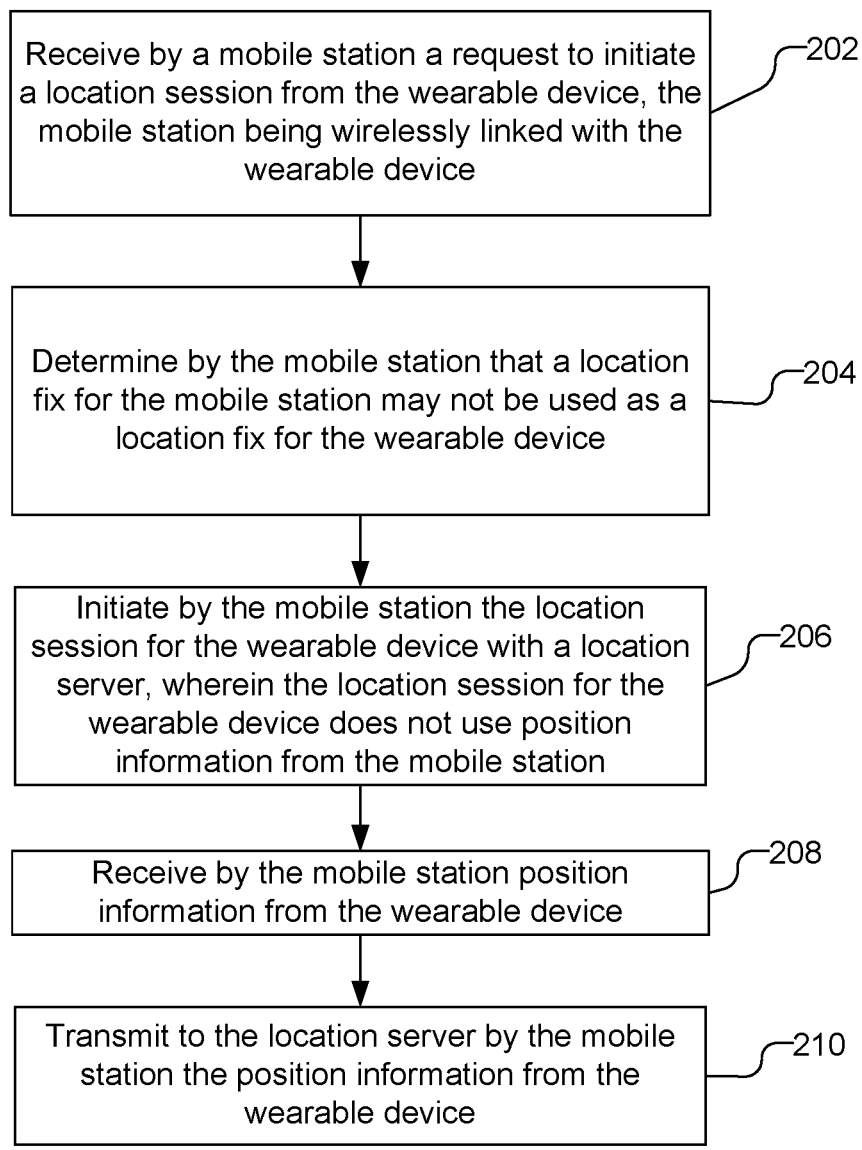
FIG. 5 is a flow chart illustrating another method of location determination for a wearable device, in which position information from the wearable device is provided to the location server through the mobile station.

FIG. 5 is a flow chart illustrating another method of location determination for a wearable device. The method illustrated in FIG. 5 is similar to the method illustrated in FIG. 4, like designated elements being the same. In addition, the mobile station receives position information from the wearable device (208) and transmits the position information from the wearable device to the location server (210). The position information from the wearable device may be, e.g., WPAN data, WLAN data, WWAN data or SPS data, as well as data from sensors including cameras, inertial sensors, pressure sensors, etc., or a combination thereof, or a position fix determined by the wearable device. For example, the position information may be at least one of received signal strength indicator (RSSI) or round trip time (RTT) measurements from one or more of an access points, a router, a bridge, a femtocell, a Bluetooth Transmitter, pico cell, small cell, radio-frequency identification (RFID), visual light communication (VLC), or base station or combination thereof.

Figure 6:
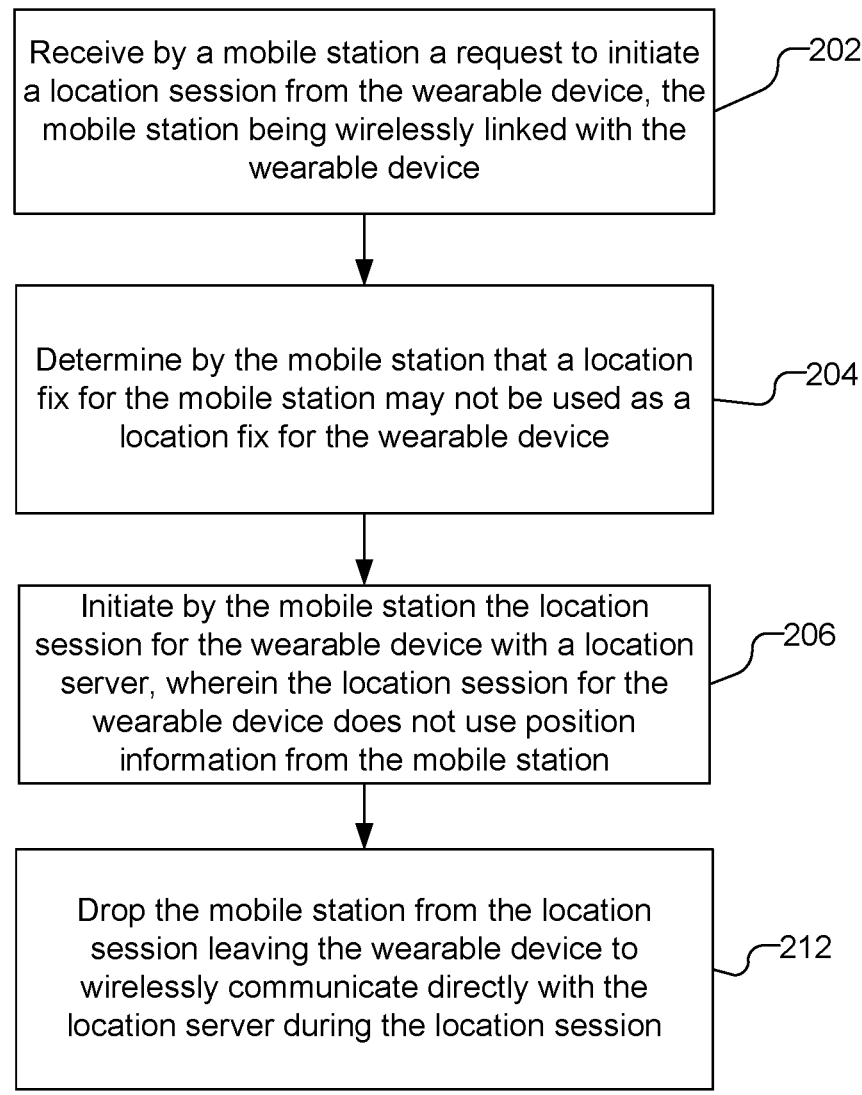
FIG. 6 is a flow chart illustrating another method of location determination for a wearable device, in which position information from the wearable device is provided directly to the location server.

FIG. 6 is a flow chart illustrating another method of location determination for a wearable device. The method illustrated in FIG. 6 is similar to the method illustrated in FIG. 4, like designated elements being the same. In addition, the mobile station may drop from the location session leaving the wearable device to wirelessly communicate directly with the location server during the location session without the assistance of the mobile station, e.g., the wearable device may communicate with the location server through a WLAN network or a WWAN network (212).

Figure 7:
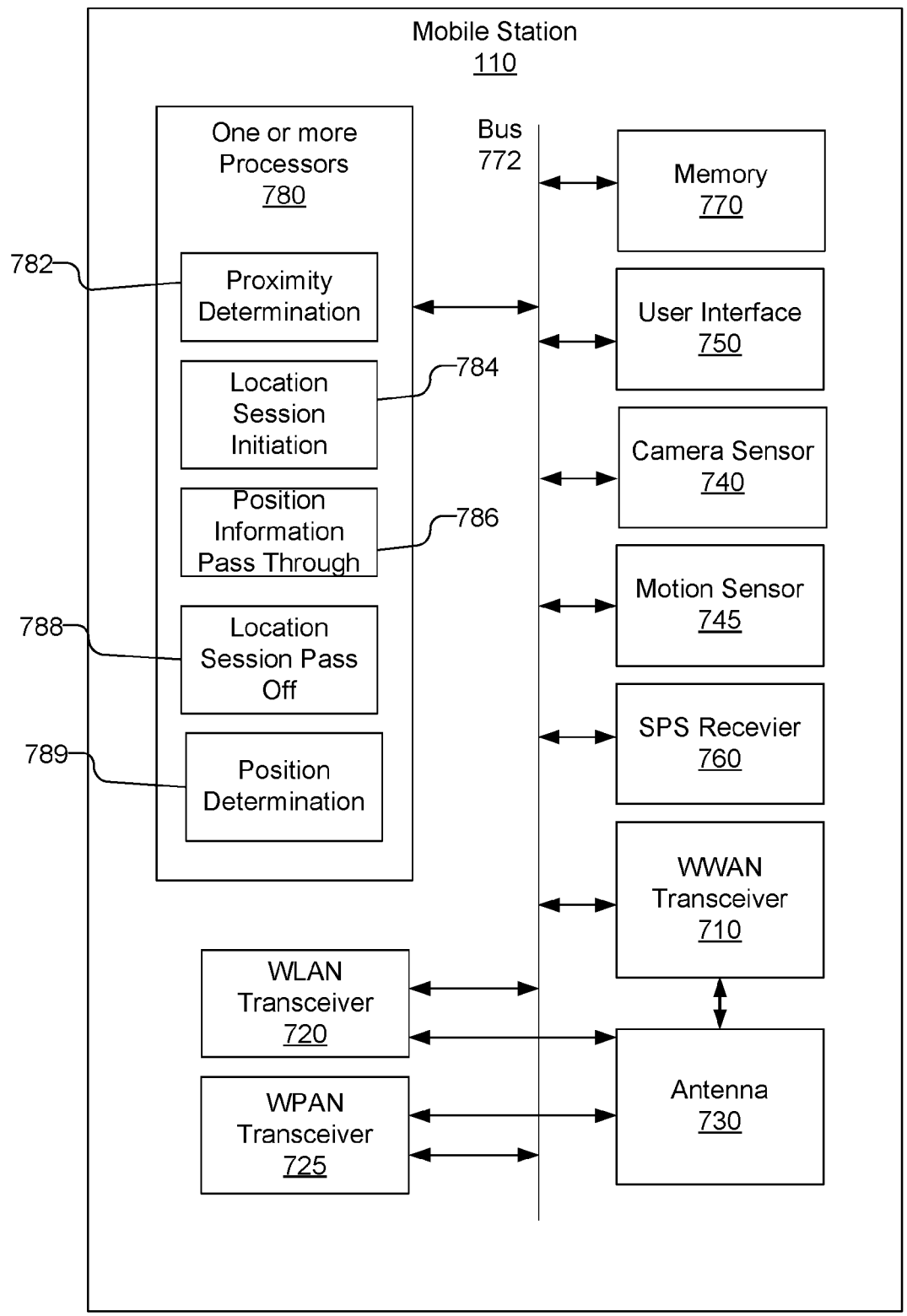
FIG. 7 is a block diagram of a mobile station capable of determining whether a location fix for the mobile station may not be used as a location fix for the wearable device and initiating a location session to determine the location of the wearable device.

FIG. 7 is a block diagram of a mobile station 110 capable of performing a method of location determination for a wearable device as discussed above. The mobile station 110 may include a WWAN transceiver 710 to wirelessly communicate with WWAN transmitters, such as cellular transceiver 150 (shown in FIG. 1) to communicate with, e.g., the location server 170 (shown in FIG. 1) in some embodiments. The mobile station 110 may include a WLAN transceiver 720 to wirelessly communicate with WLAN transmitters, such as local transceiver 130 (shown in FIG. 1) to communicate with, e.g., wearable device 100 (shown in FIG. 1) and, in some embodiments, with the location server 170 (shown in FIG. 1). The mobile station 110 may include a WPAN transceiver 725 to wirelessly communicate with other devices, such as wearable device 100 (shown in FIG. 1) using short range short range communication technology. The mobile station 110 may include one or more antennas 730 that may be used with the WWAN transceiver 710, WLAN transceiver 720 and WPAN transceiver 725. The mobile station 110 may include a camera sensor 740, which may be a camera or a light detector, and one or more motion sensors 745, such as accelerometers, gyroscopes, electronic compass, magnetometer, pressure sensor (e.g., barometer), etc. The mobile station 110 may further include an SPS receiver 760 for receiving SPS data from SPS system 180 (shown in FIG. 1). The mobile station 110 may further include a user interface 750 that may include e.g., a display, a keypad or other input device, such as virtual keypad on the display, through which a user may interface with the mobile station 110.

The mobile station 110 further includes a memory 770 and one or more processors 780, which may be coupled together with bus 772. The one or more processors 780 and other components of the mobile station 110 may similarly be coupled together with bus 772, a separate bus, or may be directly connected together or a combination of the foregoing. The memory 770 may contain executable code or software instructions that when executed by the one or more processors 780 cause the one or more processors to operate as a special purpose computer programmed to perform the algorithms disclosed herein.

As illustrated in FIG. 7, the one or more processors 780 may include one or more processing units or components that implement the methodologies as described herein. For example, the one or more processors 780 may include a proximity determination unit 782 to determine whether a location fix for the mobile station 110 may be used as a location fix for the wearable device 100, i.e., whether the wearable device 100 is proximate to the mobile station 110. After receiving a requested location session, the proximity determination unit 782 determines whether a location fix for the mobile station 110 may be used as a location fix for the wearable device 100 by determining whether the wearable device 100 is proximate to the mobile station 110. The proximity determination unit 782, for example, may determine whether the mobile station 110 is wirelessly linked directly to the wearable device 100 through the WPAN transceiver 725 or whether the mobile station 110 is wirelessly linked to the wearable 100 through the same access point to which the WLAN transceiver 720 is connected, e.g., based on the MAC address of the access point that is included in wireless messages. The proximity determination unit 782 may additionally or alternatively determine whether the wearable device 100 is proximate to the mobile station 110 based on data from sensors. For example, the proximity determination unit 782 may determine that the mobile station 110 is not being held by the user of the wearable device 100 based on the data from the motion sensors 745 such as accelerometers, gyroscopes etc., e.g., indicating that the mobile station 110 did not move when (or for a predetermined period of time before) the request for a location session was sent from the wearable device 100. In another example, the proximity determination unit 782 may determine that the mobile station 110 is not in a same environment as the wearable device 100 based on the data from a camera sensor 740, e.g., by comparing camera data from a camera sensor 740 to camera data received from the wearable device 100, including light levels, objects captured in images, or features extracted from the images.

The one or more processors 780 may further include a location session initiation unit 784, which initiates a location session for the wearable device 100 with a location server 170 through a wireless transceiver, such as WWAN transceiver 710 or WLAN transceiver 720, wherein the location session for the wearable device does not use position information from the mobile station when the proximity determination unit 782 determines that a location fix for the mobile station 110 may not be used as a location fix for the wearable device 100, i.e., the wearable device 100 is not proximate to the mobile station 110. The location session initiation unit 784, for example, may place an emergency call and initiate the emergency location session, or otherwise initiate a non-emergency location session, as requested by the wearable device 100.

The one or more processors 780 may further include a position information pass through unit 786 that obtains position information from the wearable device 100, e.g., via the WLAN transceiver 720, and causes a wireless transceiver, such as WWAN transceiver 710 or WLAN transceiver 720, to transmit the position information from the wearable device 100 to the location server 170, when the proximity determination unit 782 determines that the wearable device 100 is not proximate to the mobile station 110. The position information from the wearable device 100 may be, e.g., WPAN, WLAN, WWAN data, SPS data, as well as data from sensors including cameras, inertial sensors, pressure sensors, etc., or a combination thereof, or a position fix determined by the wearable device 100. The position information may include at least one of received signal strength indicator (RSSI) or round trip time (RTT) measurements from one or more of an access points, a router, a bridge, a femtocell, a Bluetooth Transmitter, pico cell, small cell, radio-frequency identification (RFID), and visual light communication (VLC) or base station, or a combination thereof.

The one or more processors 780 may further include a location session pass off unit 788 that drop the mobile station 110 from the location session leaving the wearable device 100 to wirelessly communicate with the location server 170 during the location session, e.g., through a WLAN or WWAN network.

The one or more processors 780 may further include a position determination unit 789 that may use position information obtained from the wearable device 100 to determine a position fix for the wearable device 100, which may then be wirelessly communicated directly with the location server 170 during the location session, e.g., through a WLAN or WWAN network.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 770, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the mobile station 110 includes a means for receiving by a mobile station a request to initiate a location session from the wearable device, the mobile station being wirelessly linked with the wearable device, which may include, e.g., WLAN transceiver 720. The mobile station 110 may further include a means for determining by the mobile station that a location fix for the mobile station may not be used as a location fix for the wearable device, which may include, e.g., the proximity determination unit 782 of the one or more processors 780, and may further include WPAN transceiver 725, WLAN transceiver 720, camera sensor 740, and motion sensor 745. The mobile station 110 may further include means for initiating by the mobile station the location session for the wearable device with a location server, wherein the location session for the wearable device does not use position information from the mobile station, which may include, e.g., the location session initiation unit 784, as well as WWAN transceiver 710 or WLAN transceiver 720.

The mobile station 110 may further include a means for receiving by the mobile station position information from the wearable device, which may include, e.g., position information pass through unit 786 and WLAN transceiver 720, and a means for transmitting to the location server by the mobile station the position information from the wearable device, which may include, e.g., position information pass through unit 786 and WWAN transceiver 710 or WLAN transceiver 720.

The mobile station 110 may further include a means for dropping the mobile station from the location session leaving the wearable device to wirelessly communicate directly with the location server during the location session, e.g., through a WLAN or WWAN network, which may include, e.g., location session pass off unit 788.

The mobile station 110 may further include a means for determining that the wearable device is not wirelessly linked directly to the mobile station through a short range communication technology, which may include, e.g., the proximity determination unit 782 of the one or more processors 780 and WPAN transceiver 725. The mobile station 110 may further include a means for determining that the wearable device is not wirelessly linked to the mobile station through a same access point in a WLAN network, which may include, e.g., the proximity determination unit 782 of the one or more processors 780 and WLAN transceiver 720.

Figure 8:
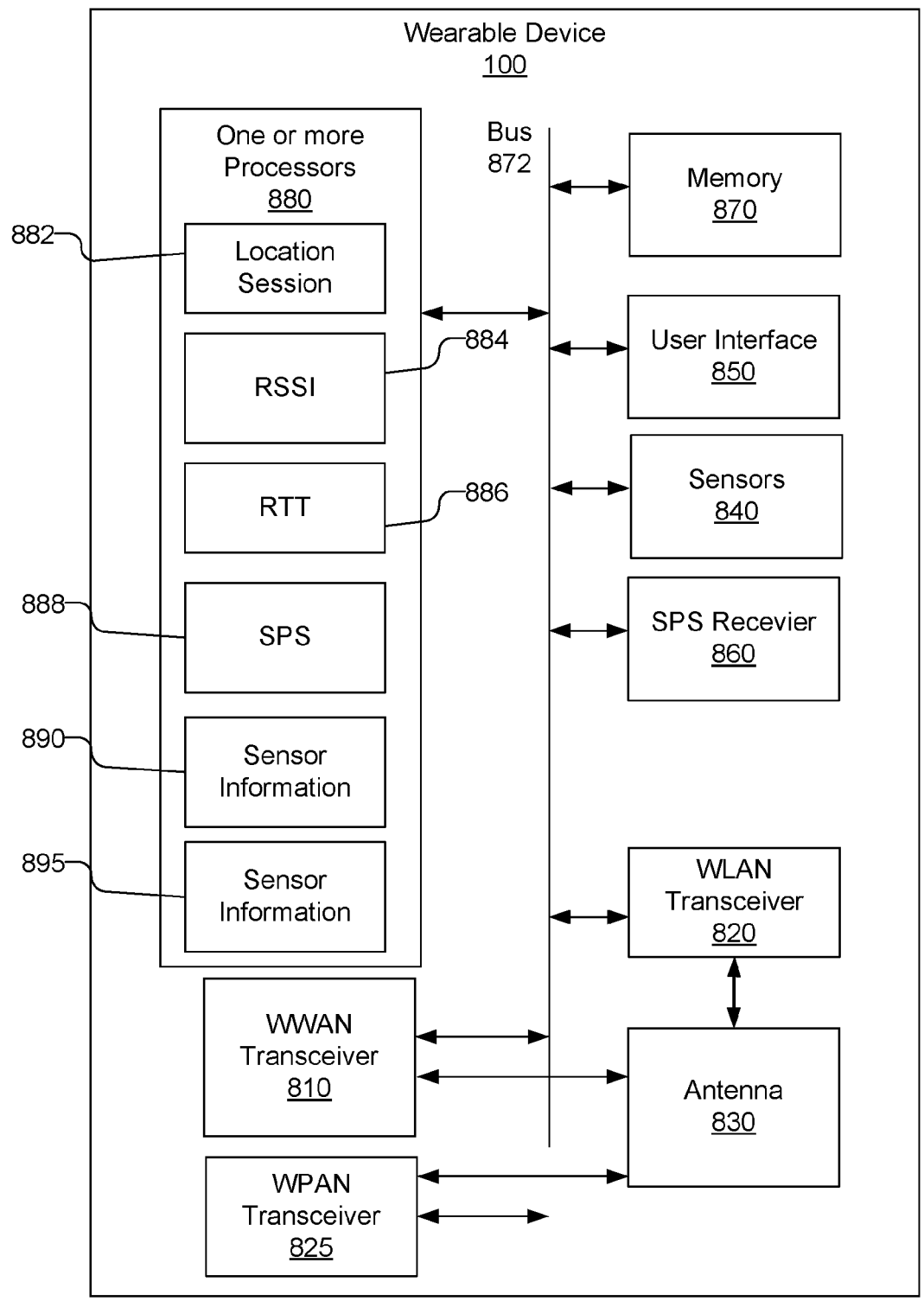
FIG. 8 is a block diagram of a wearable device capable of communicating with the mobile station to initiate a location session to determine the location of the wearable device.

FIG. 8 is a block diagram of a wearable device 100 capable of communicating with the mobile station 110 to perform a method of location determination for a wearable device as discussed above. The wearable device 100 may include a WLAN transceiver 820 to wirelessly communicate with WLAN transmitters, such as local transceiver 120 (shown in FIG. 1) to communicate with, e.g., mobile station 110 100 (shown in FIG. 1) and, in some embodiments, with the location server 170 (shown in FIG. 1). The wearable device 100 may include a WPAN transceiver 825 to wirelessly communicate with other devices, such as mobile station 110 (shown in FIG. 1) using short range short range communication technology. The wearable device 100 may include a WWAN transceiver 810 to wirelessly communicate with WWAN transmitters, such as cellular transceiver 152 (shown in FIG. 1) to communicate with, e.g., the location server 170 (shown in FIG. 1) in some embodiments. The wearable device 100 may include one or more antennas 830 that may be used with the WLAN transceiver 820 and WPAN transceiver 825, and WWAN transceiver 810 (if included). The wearable device 100 may include sensors 840, such as a camera or light sensor, motion sensors, inertial sensors, pressure sensors, etc. The wearable device 100 may further include an SPS receiver 860 for receiving SPS data from SPS satellites 180 (shown in FIG. 1). The wearable device 100 may further include a user interface 850 that may include e.g., a display, a keypad or other input device, such as virtual keypad on the display, through which a user may interface with the wearable device 100 cause the wearable device 100 to send a request for a location session to the mobile station 110, e.g., by placing an emergency call or launching an application, such as a navigation application, that requires a position fix.

The wearable device 100 further includes a memory 870 and one or more processors 880, which may be coupled together with bus 872. The one or more processors 880 and other components of the wearable device 100 may similarly be coupled together with bus 872, a separate bus, or may be directly connected together or a combination of the foregoing. The memory 870 may contain executable code or software instructions that when executed by the one or more processors 880 cause the one or more processors to operate as a special purpose computer programmed to perform the algorithms disclosed herein.

As illustrated in FIG. 8, the one or more processors 880 may include one or more processing units or components that implement the methodologies as described herein. For example, the one or more processors 880 may include a location session unit 882 that is capable of communicating, e.g., via WLAN transceiver 820 or WWAN transceiver 810, to mobile station 110 to request a location session, or to communicate with a location server 170 to determine a position fix for the wearable device 100, e.g., after the mobile station 110 drop from the location session. The one or more processors 880 may further include an RSSI unit 884 and an RTT unit 886 to perform RSSI and/or RTT measurements using the WLAN transceiver 820 and/or WWAN transceiver 810 to determine position information. The one or more processors 880 may further include an SPS unit 888 for producing SPS measurements using SPS receiver 860 to determine position information. The one or more processors 880 may further include a sensor information unit 890 that collects data from the sensors 840, such as light levels, objects captured in images, or features extracted from the images, as position information. The one or more processors 880 may further include a position determination unit 895 that uses the acquired data to determine a position fix, which may be position information. The position information may be transmitted to the mobile station 110 or location server 170 using the WLAN transceiver 820 or WWAN transceiver 810.

As discussed above, the methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 770, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of location determination for a wearable device, the method comprising:
   receiving by a mobile station a request to initiate a location session from the wearable device, the mobile station being wirelessly linked with the wearable device;
   determining by the mobile station that a location fix for the mobile station may not be used as a location fix for the wearable device; and
   initiating by the mobile station the location session for the wearable device with a location server, wherein the location session for the wearable device does not use position information from the mobile station.

2. The method of claim 1, further comprising:
   receiving by the mobile station position information from the wearable device; and
   transmitting to the location server by the mobile station the position information from the wearable device.

3. The method of claim 2, wherein the position information from the wearable device comprises Wireless Personal Area Network (WPAN) data, Wireless Local Area Network (WLAN) data, Wireless Wide Area Network (WWAN) data, satellite positioning system (SIPS) data, sensor data, position fix or a combination thereof.

4. The method of claim 3, wherein the position information comprises at least one of received signal strength indicator (RSSI) or round trip time (RTT) measurements from one or more of an access points, a router, a bridge, a femtocell, a Bluetooth Transmitter: pica cell, small cell, radio-frequency identification (RFID), visual light communication (VLC), base station, or a combination thereof.

5. The method of claim 1, the method further comprising dropping the mobile station from the location session leaving the wearable device to wirelessly communicate directly with the location server during the location session.

6. The method of claim 1, wherein determining by the mobile station that the location fix for the mobile station may not be used as the location fix for the wearable device comprises determining that the wearable device is not wirelessly linked directly to the mobile station through a Wireless Personal Area Network (WPAN).

7. The method of claim 1, wherein determining by the mobile station that the location fix for the mobile station may not be used as the location fix for the wearable device comprises determining that the wearable device is not wirelessly linked to the mobile station through a same access point in a Wireless Local Area Network (WLAN) network.

8. The method of claim 1, wherein determining by the mobile station that the location fix for the mobile station may not be used as the location fix for the wearable device comprises using sensors in the mobile station to determine that the mobile station is not with a user of the wearable device.

9. The method of claim 8, wherein using the sensors in the mobile station to determine that the mobile station is not with the user of the wearable device comprises using motion sensors to determine that the mobile station is not being held by the user or using camera sensors to determine that the mobile station is not in a same environment as the wearable device.

10. The method of claim 1, wherein the request to initiate the location session from the wearable device comprises an emergency call from the wearable device.

11. A mobile station for location determination of a wearable device, the mobile station comprising:
   a wireless transceiver capable of wireless communication with a location server; and
   at least one processor coupled to the wireless transceiver, the at least one processor configured to receive a request to initiate a location session from the wearable device that is wirelessly linked with the mobile station, determine that that a location fix for the mobile station may not be used as a location fix for the wearable device, and initiate the location session for the wearable device with the location server through the wireless transceiver, wherein the location session for the wearable device does not use position information from the mobile station.

12. The mobile station of claim 11, further comprising:
   a wireless local area network (WLAN) transceiver, wherein the wearable device is wirelessly linked with the mobile station through the WLAN transceiver;
   wherein the at least one processor is further coupled to the AVIAN transceiver and is further configured to receive position information from the wearable device through the WLAN transceiver, and to cause the wireless transceiver to transmit to the location server the position information from the wearable device.

13. The mobile station of claim 12, wherein the position information from the wearable device comprises Wireless Personal Area Network (WPAN) data, Wireless Local Area Network (WLAN) data, Wireless Wide Area Network (WWAN) data, satellite positioning system (SPS) data, sensor data, position fix or a combination thereof.

14. The mobile station of claim 13, wherein the position information comprises at least one of received signal strength indicator (RSSI) or round trip time (RTT) measurements from one or more of an access points, a router, a bridge, a femtocell, a Bluetooth Transmitter, pica cell, small cell, radio-frequency identification (RFID), and visual light communication (VIC), base station, or a combination thereof.

15. The mobile station of claim 11, wherein the at least one processor is further configured to cause the wireless transceiver to drop the mobile station from the location session leaving the wearable device to wirelessly communicate directly with the location server during the location session.

16. The mobile station of claim 11, further comprising:
a wireless personal area network (WPAN) transceiver capable of wirelessly linking the mobile station with the wearable device directly;
wherein the at least one processor is further coupled to the WPAN transceiver and is further configured to determine that the location fix for the mobile station may not be used as the location fix for the wearable device by being configured to determine that the mobile station is not wirelessly linked to the wearable device through the WPAN transceiver.

17. The mobile station of claim 11, further comprising:
a wireless local area network (WLAN) transceiver capable of wirelessly linking to a WLAN network;
wherein the at least one processor is further coupled to the WLAN transceiver and is further configured to determine that the location fix for the mobile station may not be used as the location fix for the wearable device by being configured to determine that the mobile station is not wirelessly linked to the wearable device through a same access point in the WLAN network.

18. The mobile station of claim 11, further comprising:
at least one of motion sensors and a camera sensor;
wherein the at least one processor is further coupled to receive data from the at least one of the motion sensors and the camera sensor and is further configured to determine that the location fix for the mobile station may not be used as the location fix for the wearable device by being configured to determine that the mobile station is not being held by a user based on the data from the motion sensors or that the mobile station is not in a same environment as the wearable device based on the data from the camera sensor.

19. The mobile station of claim 11, wherein the request to initiate the location session from the wearable device comprises an emergency call from the wearable device.

20. A mobile station for location determination of a wearable device, the mobile station comprising:
means for receiving by the mobile station a request to initiate a location session from the wearable device, the mobile station being wirelessly linked with the wearable device;
means for determining by the mobile station that a location fix for the mobile station may not be used as a location fix for the wearable device; and
means for initiating by the mobile station the location session for the wearable device with a location server, wherein the location session for the wearable device does not use position information from the mobile station.

21. The mobile station of claim 20, further comprising:
means for receiving by the mobile station position information from the wearable device; and
means for transmitting to the location server by the mobile station the position information from the wearable device.

22. The mobile station of claim 20, further comprising means for dropping the mobile station from the location session leaving the wearable device to wirelessly communicate directly with the location server during the location session.

23. The mobile station of claim 20, wherein the means for determining that the location fix for the mobile station may not be used as the location fix for the wearable device comprises means for determining that the wearable device is not wirelessly linked directly to the mobile station through a wireless personal area network (WPAN).

24. The mobile station of claim 20, wherein the means for determining that the location fix for the mobile station may not be used as the location fix for the wearable device comprises means for determining that the wearable device is not wirelessly linked to the mobile station through a same access point in a WLAN (Wireless Local Area Network) network.

25. A non-transitory computer-readable medium for location determination of a wearable device, the non-transitory computer-readable medium including program code stored thereon, comprising:
program code to receive by a mobile station a request to initiate a location session from the wearable device, the mobile station being wirelessly linked with the wearable device;
program code to determine by the mobile station that a location fix for the mobile station may not be used as a location fix for the wearable device; and
program code to initiate by the mobile station the location session for the wearable device with a location server, wherein the location session for the wearable device does not use position information from the mobile station.

26. The non-transitory computer-readable medium of claim 25, further comprising:
program code to receive by the mobile station position information from the wearable device; and
program code to transmit to the location server by the mobile station the position information from the wearable device.

27. The non-transitory computer-readable medium of claim 25, further comprising program code to drop the mobile station from the location session leaving the wearable device to wirelessly communicate directly with the location server during the location session.

28. The non-transitory computer-readable medium of claim 25, wherein the program code to determine by the mobile station that the location fix for the mobile station may not be used as the location fix for the wearable device comprises program code to determine that the wearable device is not wirelessly linked directly to the mobile station through a wireless personal area network (WPAN).

29. The non-transitory computer-readable medium of claim 25, wherein the program code to determine by the mobile station that the location fix for the mobile station may not be used as the location fix for the wearable device comprises pro Pram code to determine that the wearable device is not wirelessly linked to the mobile station through a same access point in a WLAN (Wireless Local Area Network) network.

* * * * *